(No Model.)

N. J. SMITH.
CHEESE CUTTER.

No. 553,768. Patented Jan. 28, 1896.

WITNESSES:
Jos. A. Ryan
U. A. Blondel

INVENTOR
Nicholls J. Smith
BY Munn & Co.
ATTORNEYS.

UNITED STATES PATENT OFFICE.

NICHOLLS J. SMITH, OF WAYCROSS, GEORGIA.

CHEESE-CUTTER.

SPECIFICATION forming part of Letters Patent No. 553,768, dated January 28, 1896.

Application filed August 28, 1895. Serial No. 560,795. (No model.)

*To all whom it may concern:*

Be it known that I, NICHOLLS J. SMITH, of Waycross, in the county of Ware and State of Georgia, have invented a new and useful Improvement in Cheese-Cutters, of which the following is a specification.

My invention is an improvement in cheese-cutters seeking to provide a simple mechanism by which the cheese may be cut neatly and with ease and by which there may be cut from the body of cheese a slice of any desired predetermined weight; and the invention consists in certain novel constructions, combinations and arrangements of parts as will be hereinafter described and pointed out out in the claims.

Figure 1:
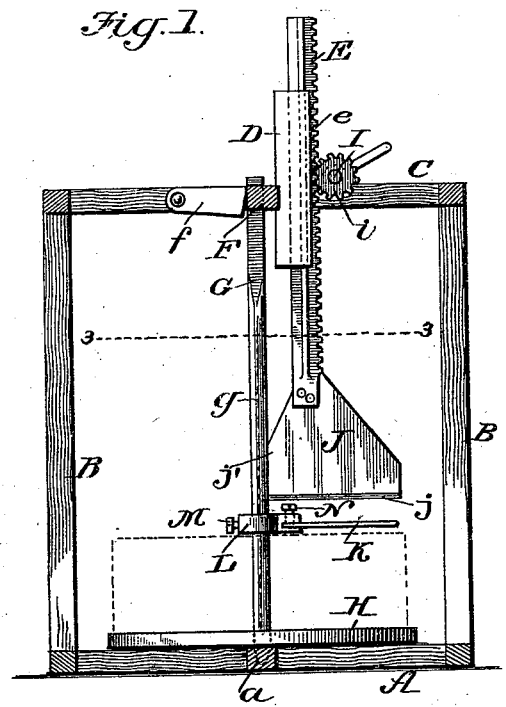
Figure 2:
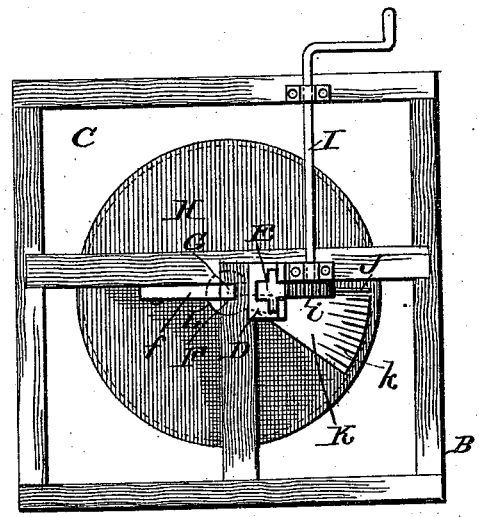
Figure 3:
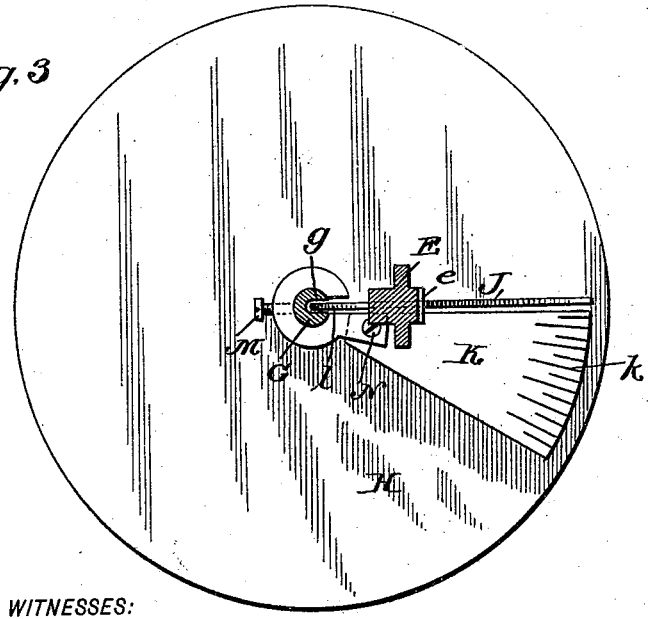

In the drawings, Figure 1 is a sectional elevation. Fig. 2 is a top plan view of my improved cutter; and Fig. 3 is a cross-section on about line 3 3, Fig. 1.

In carrying out my invention I provide a suitable frame, which may be composed of a base A, uprights B and top C, the latter having a guideway D for the rack-bar E and a seat F for the center rod G. A revolving table H is supported on the base A and has a central opening through which the center rod G projects into a socket $a$ in the base, and the upper end of the center rod is preferably non-circular and fitted in the seat F, where it is held by a latch $f$, preferably a turn-button, which can be readily set to clamp or release the center rod. This center rod has a longitudinal groove $g$ for the purpose presently described. The rack-bar E is movable vertically in the guideway D and has its rack $e$ engaged by the pinion $i$ on the hand-shaft I, by turning which the rack may be fed quickly up or down. To this rack-bar is secured the cutter J, which is, in the construction shown, a blade with its edge $j$ set radially to the center rod and table, and it is provided with a rearwardly-projected tongue or portion $j'$, which operates in the groove $g$ of the center rod so the cutter is guided and also so it cuts cleanly to the central opening in the cheese.

To enable the user to cut a slice of any desired weight and thus avoid the loss to the merchant from cutting overweight or the dissatisfaction of the customer because of making up the weight with small slices, I provide the gage-plates K, which have a radial edge $k$ and are graduated and inscribed each for a cheese of a given diameter, thickness, and weight, so that when a cheese of a given weight is put on the cutter the plate corresponding to such cheese should be selected and applied and supported above the cheese by the construction shown, consisting of a collar L clamped by screw M to the center rod. This collar L has a cut-out portion or opening $l$ leading to its center, through which the cutter-blade projects, and is provided with a notch or seat N for the indicating-plate, which is secured within said seat by the clamp-screw N, so that its radial edge will be just to one side of the path of the cutter-knife.

In operation the cheese is applied, the center rod inserted through it, and the proper indicating-plate applied and secured. A cut is then made through the cheese and the latter turned until such cut registers with the graduation of the indicating-plate marking the weight of slice desired, when by properly operating the knife the slice of the desired weight will be cut.

Ordinarily the indicator-plates are different sizes, the plate for an eighteen-pound cheese extending about three inches from the center post, that for a twenty-four-pound cheese about four inches, and all the indicators bearing the marks as on an ordinary rule or square, one inch marking the cut for one pound, and so on.

Having thus described my invention, what I claim as new, and desire to secure by Letters Patent, is—

1. In a cheese-cutting apparatus the combination of the framing, the indicating-plate, the center rod, the blade or cutter, the collar held to the center rod and having a notch or seat for the indicating-plate and a clamp by which to secure the indicating-plate in said notch or seat substantially as set forth.

2. A cheese-cutting apparatus comprising the framing, the center rod having a longitudinal groove, the collar fitting and clamped on said rod and having a cut-out portion registering with the groove of the rod, the indicating-plate held to said collar and the blade or cutter having a portion operating in the groove of the center rod substantially as and for the purposes set forth.

3. The combination of the rod, a collar fitted thereon and having an opening leading outward from the rod, such collar being provided with a seat for the indicator-blade, the indicator-blade fitted to said seat, devices for detachably clamping the blade to its seat whereby such blade may be readily applied and removed and means for clamping the collar to the rod and the cutter extended through the opening in the collar substantially as and for the purposes set forth.

NICHOLLS J. SMITH.

Witnesses:
E. H. CRAWLEY,
JAS. KNOX, Jr.